Dec. 3, 1968  H. E. MESCHER ET AL  3,414,249
FLUID TREATING TRANSFER MECHANISM
Filed June 10, 1966  2 Sheets-Sheet 1

INVENTORS
HAROLD E. MESCHER
ROBERT L. MORTON
BY Paul B. Hunter
ATTORNEY

Dec. 3, 1968  H. E. MESCHER ET AL  3,414,249
FLUID TREATING TRANSFER MECHANISM
Filed June 10, 1966  2 Sheets-Sheet 2
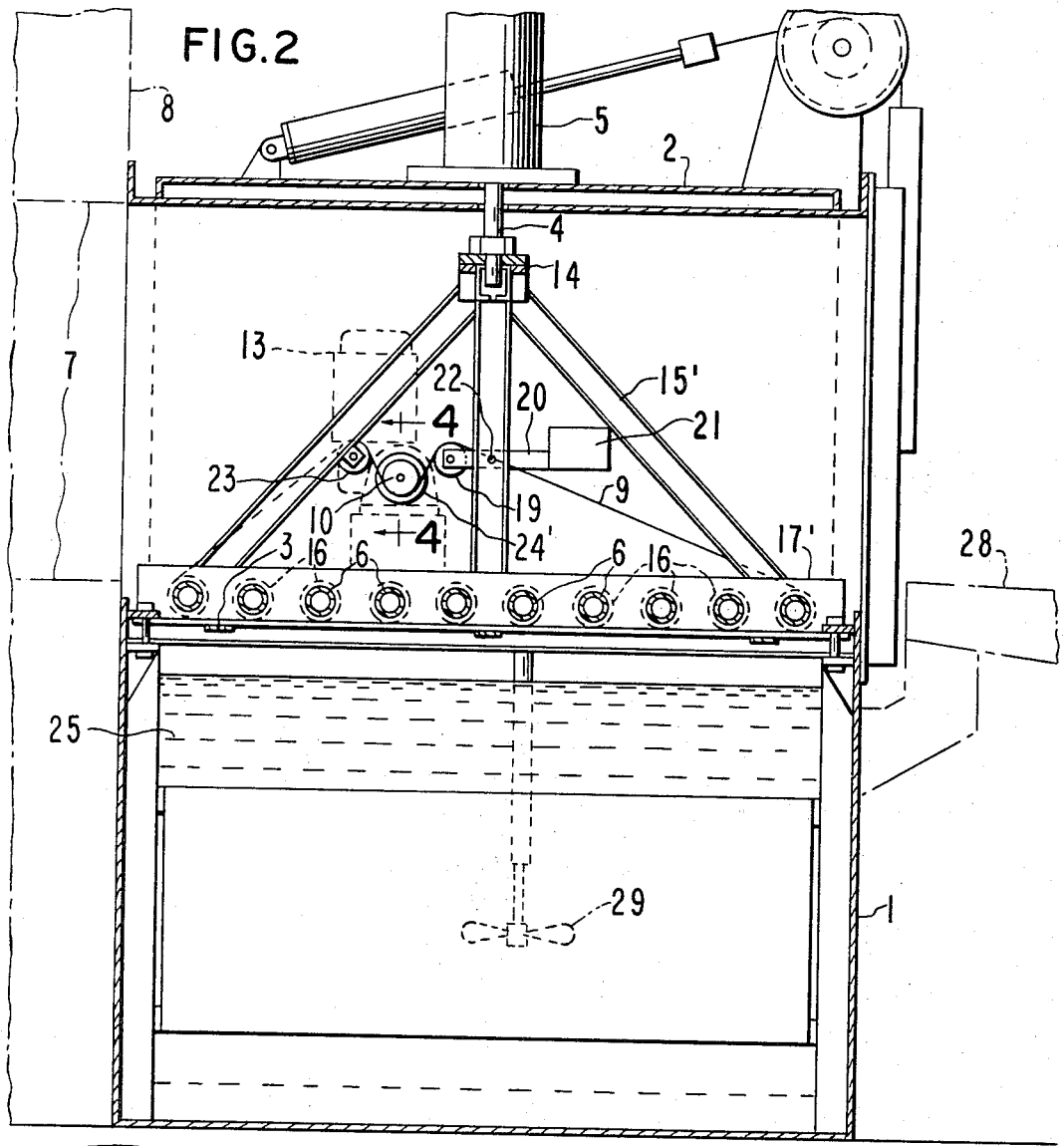
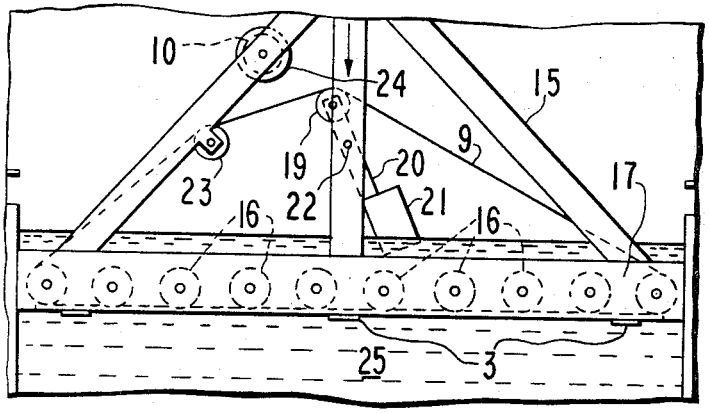
INVENTORS
HAROLD E. MESCHER
ROBERT L. MORTON
BY Paul B. Hunter
ATTORNEY

United States Patent Office 3,414,249
Patented Dec. 3, 1968

3,414,249
FLUID TREATING TRANSFER MECHANISM
Harold E. Mescher, Pico Rivera, and Robert L. Morton, Santa Ana, Calif., assignors to Pacific Scientific Company, Commerce, Calif., a corporation of California
Filed June 10, 1966, Ser. No. 556,639
2 Claims. (Cl. 266—6)

ABSTRACT OF THE DISCLOSURE

A vertically movable carriage for heat treating furnaces having work carrying rollers driven by a sprocket chain held taught by a weighted idler and positioned by the latter so as to engage a fixed drive sprocket whenever the carriage moves upwardly to its loading and unloading position.

---

The invention relates generally to a novel transfer mechanism for receiving objects such as a workload from a heat-treating furnace chamber and for rapidly immersing the same into a tank of circulated oil, water, or other liquid, for cooling or quenching the workload, which then is transferred out of the tank holding the liquid medium, the said transfer mechanism being suitable for oher uses such as for immersing a workload to be cleansed into the washing medium of an industrial-type washing machine and, after scrubbing or washing the workload, the transfer mechanism raises the workload out of the washing medium and discharges the same as on to a receiving platform.

Heretofore, such workloads have been handled either manually or by complicated retractor mechanisms, push rods, or chain mechanisms with dogs attached to the chain to effect immersing the work in the quench tank or other tank such as a cleansing tank and removing the same therefrom.

An improved mechanism for accomplishing the desired result is illustrated in U.S. Patent No. 2,977,107, wherein a movable platform rotates down into a tank containing liquid and is later moved upwardly along an arc to remove the workload therefrom. The inventor in this patent, Harold E. Mescher, is one of the inventors in the present application.

The principal object of the present invention is to provide a novel simply constructed, reliable transfer mechanism for receiving a workload, for immersing the same into a liquid treating medium within a tank for treatment therein and then removing the workload from the tank, in a dependable and economical manner and thereafter discharging the workload upon a suitable unload table or other receiving means.

A feature of the present invention is to provide a novel transfer mechanism of the above character having a vertically movable carriage provided with a roller platform and including roller sprockets and a chain drive therefor for turning the rollers of said platform for moving work over the carriage, the roller chain drive being automatically disconnected from its driving sprocket when the carriage is immersed into a treating medium.

These and other features and advantages of the present invention will be more apparent after a perusal of the following specification taken in connection with the accompanying drawings wherein:

FIG. 2 is a partial sectional view taken along the line 2—2 of FIG. 1 looking in the direction of the arrows;

FIG. 3 is a fragmentary view of a portion of FIG. 2 showing the carriage immersed in the treating liquid;

Similar characters of reference are used in the above figures to designate corresponding parts.

Figure 1:
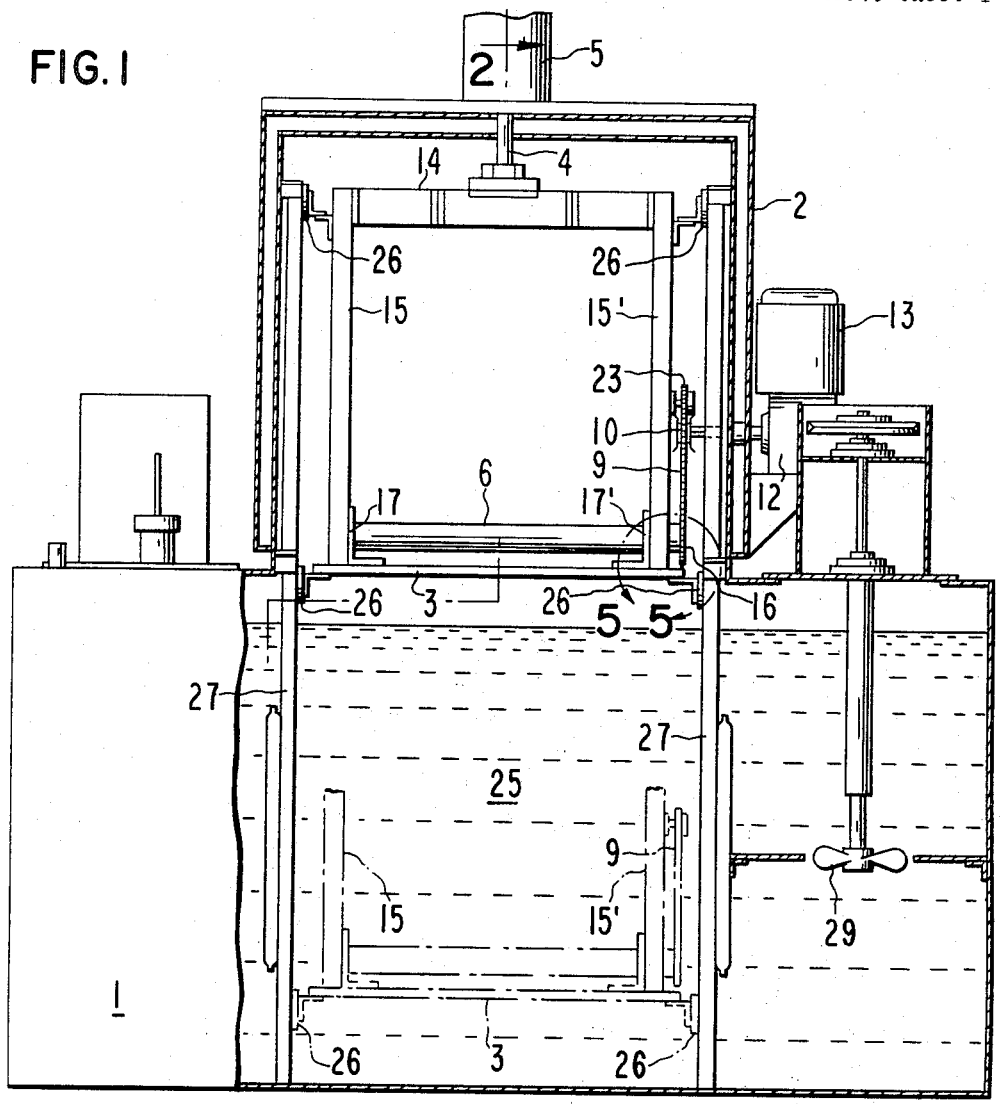
FIG. 1 is a partial vertical sectional view of the novel transfer mechanism of the present invention.

Referring now to the drawings, the reference numeral 1 designates the housing of the transfer mechanism of the present invention, which housing is adapted to contain a liquid treating medium such as oil, water or a cleansing fluid. The housing has its upper portion 2 shown as water-jacketed for effecting air cooling of work within the upper portion, as when the mechanism is used in connection with a heat-treating furnace. A vertically movable carriage 3 is contained within housing 2 and has an upper cross-bar 14 supported by a depending piston rod 4 that extends upwardly into a pneumatic cylinder 5 resting on the housing portion 2. The cross-bar 14 supports depending A-frames 15 and 15′ at its ends, which A-frames in turn support the carriage 3. This carriage has a conveyor supported thereon consisting of a series of mutually spaced rollers 6 rotatably supported at their end portions in bearings provided in spaced angle bars 17 and 17′ forming a part of carriage 3.

A piston (not shown) within the cylinder 5 serves to raise and lower the piston rod 4 and hence the carriage 3. When this carriage is in its upper position as shown in FIG. 2, for example, the series of mutually spaced rollers 6 supported by this cariage have their upper surfaces in a common plane for receiving work moved thereonto as from an opening 7 of a heat-treating furnace 8. The rollers 6 have sprockets 16 fixed on one of their ends that are driven in synchronism by means of a sprocket chain 9 that, in turn, is driven from a drive sprocket 10 fixed on a shaft 11 extending outwardly through the upper portion 2 of the housing 1 and is driven by reduction gearing in box 12 that in turn is driven from a motor 13.

Figure 4:
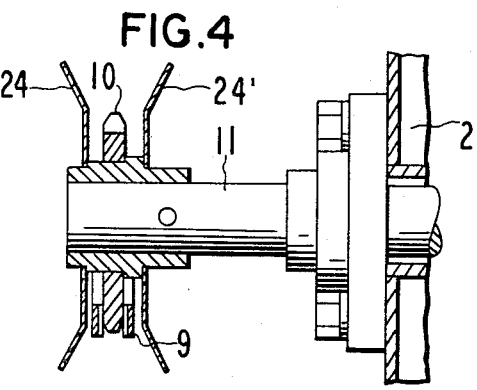
FIG. 4 is an enlarged sectional view taken along the line 4—4 of FIG. 2.
Figure 5:
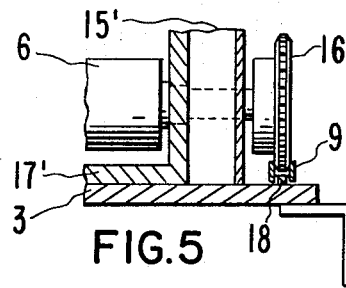
FIG. 5 is an enlarged fragmentary sectional view taken in the region of line 5—5 of FIG. 1.

The lower run of the sprocket chain 9 is held in driving engagement with the roller sprockes 16 by means of a guide bar 18 (see particularly FIG. 5), bar 18 being carried by the carriage 3. From the end sprockets 16, the upper run of the chain 9 passes up and over a tensioning idler 19 that is carried by pivoted arm 20 that carries a weight 21, the pivotal pin for arm 20 being shown at 22. From the idler 19 the chain 9 as shown in FIG. 2 passes under drive sprocket 10 and over an idler 23, both idlers 19 and 23 being supported upon the A-frame 15′. The drive sprocket 10 is provided with spaced guide flanges 24, 24′ (see particularly FIG. 4) which serve to insure that chain 9 will mesh with drive sprocket 10, as will further appear. The carriage 3 has depending guide rollers 26 engaging frames 27 within the housing 1 which serve to guide this carriage in its vertical movements. Since the chain 9 is carried by the carriage 3, it will move up and down with the carriage and, when this carriage moves downwardly so as to be immersed in the treating fluid 25, it will be noted that the sprocket chain 9 becomes disconnected from the guide sprocket 10, this sprocket chain being held taut however by the action of weight 21.

With this construction, the drive chain 9 and connected rollers remain stationary while the carriage moves up and down. As the carriage 3 approaches the upper end of its movement, the guide flanges 24 and 24′ will guide the chain 9 on the drive sprocket 10, so that this sprocket will always mesh in driving relation to the sprocket chain when the carriage is in its upper position as shown in FIG. 2, although this sprocket chain becomes disconnected from the sprocket as soon as the carriage starts to move downwardly, so that in this way it is not necessary to immerse the driving mechanism, i.e., the motor 13, gear box 12 and the connected driving sprocket 10 into the liquid medium.

In use, the work to be treated is pushed on to the carriage 3 while it is in its upper position, as shown in FIGS. 1 and 2, the rollers 6 serving to aid in this action, assuming that motor 13 is operating which is controlled automatically. The work can then either be air-cooled in the upper portion 2 of housing 1 due to the water-cooled walls of this upper portion, or the carriage 3 can be lowered by means of pneumatic cylinder 5 into the liquid medium 25 and quenched therein, the drive of the rollers stopping automatically as the carriage starts to move downwardly. After the work has been treated within the medium 25, the carriage is then raised by the cylinder 5 and the chain 9 will mesh automatically with drive sprocket 10 due to the guiding action of guide flanges 24 and 24', whereupon, with the starting of motor 13, the work is automatically driven by the rollers 6 out of the housing 1 and on to a receiving platform 28 which may be of the gravity-feed type. Agitating impellers 29 may be used to circulate the fluid medium 25.

While the novel transfer mechanism is described in connection with a heat-treating furnace, it will be obvious that the same could be used as where it is desired to cleanse parts by immersing them into a suitable cleaning fluid 25 or for other uses wherever it is desired to immerse articles into a vat containing a treating medium and then remove the same therefrom.

Since many changes could be made in the above construction of the novel transfer mechanism of this invention and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A transfer mechanism comprising a housing adapted to contain a treating fluid, a vertically movable carriage within said housing for receiving work thereon, said carriage having a conveyor having mutually spaced rollers for supporting the work, said rollers having sprockets fixed thereon, a sprocket chain on said carriage for actuating said rollers to move the work thereover by driving said roller sprockets, a guide bar carried by said carriage for continuously holding said sprocket chain in engagement with said roller sprockets, a weighted lever provided on said carriage and carrying a tensioning idler for engaging said chain above said rollers, and a drive sprocket fixedly carried by said housing and positioned for meshing with said drive chain when said carriage moves into its upper work-receiving and discharging position, said sprocket chain being held taut at all times by said tensioning idler and positioned by the latter so that as the chain moves upwardly it will engage said drive sprocket, said sprocket chain moving away from said drive sprocket during the lowering of said carriage and the work carried thereby into the treating fluid contained within said housing.

2. A transfer mechanism as defined in claim 1 wherein said drive sprocket is provided with mutually spaced guide flanges for aiding said tensioning idler in causing said sprocket chain to always mesh with said drive sprocket whenever said carriage moves into its upper work-receiving and discharging position.

References Cited

UNITED STATES PATENTS

| | | | |
|---|---|---|---|
| 1,564,615 | 12/1925 | Olsen | 118—425 |
| 2,713,480 | 7/1955 | Ruckstahl | 266—4 XR |
| 2,777,683 | 1/1957 | Ferguson | 266—4 |
| 2,853,084 | 9/1958 | Lipshaw | 134—83 XR |
| 2,965,369 | 12/1960 | Acker et al. | 266—4 |
| 2,977,107 | 3/1961 | Mescher | 266—4 |
| 3,149,189 | 9/1964 | Gogan | 266—4 XR |
| 3,191,919 | 6/1965 | Acker | 266—4 |
| 3,219,330 | 11/1965 | Acker | 266—4 |

WILLIAM J. STEPHENSON, *Primary Examiner.*

R. SPENCE ANNEAR, *Assistant Examiner.*